United States Patent
Hayashi et al.

(10) Patent No.: US 10,132,028 B2
(45) Date of Patent: Nov. 20, 2018

(54) METHOD FOR MANUFACTURING FABRIC

(71) Applicants: HONDA MOTOR CO., Ltd., Tokyo (JP); TB Kawashima Co., Ltd., Shiga (JP)

(72) Inventors: Rie Hayashi, Saitama (JP); Kohei Ohara, Shiga (JP); Takayuki Oishi, Shiga (JP); Tatsuya Fukui, Shiga (JP)

(73) Assignees: Honda Motor Co., Ltd., Tokyo (JP); TB Kawashima Co., Ltd., Shiga (JP)

( * ) Notice: Subject to any disclaimer, the term of this patent is extended or adjusted under 35 U.S.C. 154(b) by 0 days.

(21) Appl. No.: 15/671,805

(22) Filed: Aug. 8, 2017

(65) Prior Publication Data
US 2018/0058000 A1    Mar. 1, 2018

(30) Foreign Application Priority Data
Aug. 23, 2016 (JP) .................. 2016-162876

(51) Int. Cl.
| | |
|---|---|
| *D06M 13/08* | (2006.01) |
| *B32B 5/02* | (2006.01) |
| *B32B 5/18* | (2006.01) |
| *B32B 27/36* | (2006.01) |
| *D06M 13/282* | (2006.01) |

(Continued)

(52) U.S. Cl.
CPC ............ *D06M 13/08* (2013.01); *B32B 5/02* (2013.01); *B32B 5/18* (2013.01); *B32B 27/36* (2013.01); *D06M 13/282* (2013.01); *D06M 15/263* (2013.01); *B32B 2260/021* (2013.01); *B32B 2260/046* (2013.01); *B32B 2262/0276* (2013.01); *B32B 2305/022* (2013.01); *B32B 2305/18* (2013.01); *B32B 2307/3065* (2013.01); *B32B 2307/7265* (2013.01); *B32B 2367/00* (2013.01); *B32B 2601/00* (2013.01); *D06M 2101/32* (2013.01); *D06M 2200/01* (2013.01);

(Continued)

(58) Field of Classification Search
CPC ... B32B 5/02; B32B 2601/00; B32B 2367/00; B32B 2307/7265; B32B 2307/3065; B32B 2305/18; B32B 2305/022; B32B 2262/0276; B32B 2260/046; B32B 2260/021; B32B 27/36; B32B 5/18; D06M 2200/12; D06M 2200/11; D06M 2200/01; D06M 2101/32; D06M 15/263; D06M 13/282; D06M 13/08; D06M 2200/30
See application file for complete search history.

(56) References Cited

U.S. PATENT DOCUMENTS

| | | | | |
|---|---|---|---|---|
| 5,630,846 A | * | 5/1997 | Hara | ............ D06M 11/17 427/389 |
| 6,472,019 B1 | * | 10/2002 | Yamaguchi | ......... D06M 13/262 427/354 |

FOREIGN PATENT DOCUMENTS

JP    2004-076202 A    3/2004

* cited by examiner

Primary Examiner — Vishal I Patel
(74) Attorney, Agent, or Firm — Hodgson Russ LLP (57) ABSTRACT

Provided is a method for manufacturing a fabric having excellent stain resistance and flame retardancy. The method of manufacturing a fabric of the present invention includes the steps of (a) immersing a polyester fabric in a treatment liquid containing a first fluorine-based water-and-oil repellent agent to incorporate the treatment liquid thereinto, followed by drying the fabric; (b) coating one surface of the fabric with a coating composition containing a second fluorine-based water-and-oil repellent agent and a flame (Continued)

1A

1B retardant; and (c) cleaning the fabric having the coating layer formed thereon with hot water of 65° C. to 90° C.

7 Claims, 2 Drawing Sheets

(51) Int. Cl.
*D06M 15/263* (2006.01)
*D06M 101/32* (2006.01)
(52) U.S. Cl.
CPC .... *D06M 2200/11* (2013.01); *D06M 2200/12* (2013.01); *D06M 2200/30* (2013.01)

METHOD FOR MANUFACTURING FABRIC

CROSS-REFERENCE TO RELATED APPLICATIONS

The present application claims priority to Japanese Patent Application No. 2016-162876, filed on Aug. 23, 2016, the disclosure of which is incorporated herein by reference.

BACKGROUND OF THE DISCLOSURE

Field of the Invention

The present invention relates to a method for manufacturing a fabric having flame retardancy and stain resistance.

Description of the Related Art

For fabrics used for interiors of a vehicle, a marine vessel, an aircraft or the like (e.g., a fabric used for a vehicle seat such as an automobile seat and a fabric used for a trimming material such as a door lining), flame retardancy is required and at the same time, higher stain resistance is required because of difficulty in washing or cleaning such fabrics.

As a stain resistant treatment, it is known to apply a water-and-oil repellent coating to the front surface of the fabric, and as a flame retardant treatment, it is known to apply a flame retardant coating to the rear surface of the fabric. However, when the water-and-oil repellent coating is applied to the fabric, there arises a problem that fabric texture is impaired (hardened). Further, when the fabric is subjected to the flame retardant treatment, the stain resistance tends to deteriorate.

In particular, when a vehicle such as an automobile is exposed to sunlight for a long time in summer, the temperature inside the vehicle may increase to about 80° C. As an effect of a fluorine-based water-and-oil repellent agent, however, water-and-oil repellency against a liquid having a temperature around 80° C. tends to deteriorate, so that it is difficult to maintain high stain resistance under such high temperature conditions.

As a fabric exhibiting excellent flame retardancy and water repellency even under a high temperature, JP-A-2004-76202 discloses a fabric of which the surface is covered with a flame retardant and a siloxane polymer, but has not fully discussed about stain resistance against oil.

SUMMARY OF THE INVENTION

The present invention has been made so as to solve the above-described problems, and an object of the present invention is to provide a fabric having excellent stain resistance and flame retardancy.

Solution to Problems

As a result of repeated studies in order to solve the above problems, the present inventors succeeded in overcoming the above-described problems by impregnating a polyester fabric with a fluorine-based water-and-oil repellent agent, thereafter, forming a coating layer containing a fluorine-based water-and-oil repellent agent and a flame retardant on one surface of the fabric, and further cleaning the fabric having the coating layer formed thereon with hot water of 65° C. to 90° C.

In other words, the present invention is a method for manufacturing a fabric, including the steps of:
(a) immersing a polyester fabric in a treatment liquid containing a first fluorine-based water-and-oil repellent agent to incorporate the treatment liquid thereinto, followed by drying the fabric;
(b) coating one surface of the fabric with a coating composition containing a second fluorine-based water-and-oil repellent agent and a flame retardant; and
(c) cleaning the fabric having the coating layer formed thereon with hot water of 65° C. to 90° C.

A desired stain resistance can be achieved by impregnating a polyester fabric with a fluorine-based water-and-oil repellent agent. However, when a flame-retardant back coat layer is formed on the fabric in order to further impart flame retardancy to the fabric, stain resistance deteriorates.

On the other hand, the present invention has succeeded in satisfying excellent stain resistance and flame retardancy by forming a coating layer containing a fluorine-based water-and-oil repellent agent and a flame retardant on one surface of the fabric (in particular, the rear surface of the fabric) (step b), and thereafter running the fabric under hot water (step c).

In the step (b), the coating is preferably carried out so that the second fluorine-based water-and-oil repellent agent content of the coating layer, per unit area of fabric, is in the range of 0.5 g/m$^2$ to 4.0 g/m$^2$, and the flame retardant content of the coating layer, per unit area of fabric, is in the range of 25 g/m$^2$ to 60 g/m$^2$.

It is preferable that the coating composition contains a binder selected from an acrylic resin, a urethane resin, and a polyester resin and the coating of step (b) is carried out so that the binder content of the coating layer, per unit area of fabric, is in the range of 15 g/m$^2$ to 35 g/m$^2$.

As a preferred example of the flame retardant, a phosphorus flame retardant having a solubility to water at 20° C. of 4.0% or less may be used.

The method of the present invention may include a step of cleaning the fabric after the step (a) and before the step (b).

The method of the present invention may further include a step of bonding a foam sheet to the one surface of the fabric after the step (c). The fabric having the foam sheet bonded to one side thereof is suitable to be used as an exterior material of a vehicle seat or the like.

According to the present invention, a fabric having high flame retardancy and stain resistance can be provided. The fabric manufactured by the method of the present invention is also excellent in texture.

BRIEF DESCRIPTION OF THE DRAWINGS

FIG. 1 is a diagram illustrating the fabric of the present invention, wherein FIG. 1A shows the fabric formed with coating layer (2) on the rear surface side of polyester fabric (1), and FIG. 1B shows the fabric further having foam sheet (3) bonded thereto.

DETAILED EXPLANATION OF THE PREFERRED EMBODIMENTS

In the present invention, one side of a polyester fabric impregnated with a fluorine-based water-and-oil repellent agent is coated with a composition containing a fluorine-based water-and-oil repellent agent and a flame retardant, and thereafter, the fabric is run under hot water (hot water cleaning).

Even though the fabric is impregnated with the fluorine-based water-and-oil repellent agent, when a flame-retardant back coat layer is formed on the fabric in order to further impart flame retardancy, the stain resistance of the fabric lowers. Instead of forming the flame-retardant back coat layer on the fabric, even though the fabric is processed in a bath containing a flame retardant-containing treatment liquid, it is difficult to impart satisfactory flame retardancy to the fabric and stain resistance tends to lower in this case as well. The reason why the flame retardant treatment lowers the stain resistance is that an emulsifier or a surfactant is contained in the flame retardant composition to be used when fiber products are subjected to flame retardant treatment, so that these agents may be considered to adversely affect stain resistance.

When the fluorine-based water-and-oil repellent agent is added to a flame retardant coating composition to form a flame-retardant stain-resistant coating layer, stain resistance is improved compared to the case of using a flame retardant agent alone, but it is still difficult to achieve stable stain resistance.

On the other hand, in the present invention, when a coating layer containing a fluorine-based water-and-oil repellent agent and a flame retardant is formed on one surface (in particular, the rear surface) of the fabric, followed by hot water cleaning, a fabric excellent in both stain resistance and flame retardancy, further having good texture can be provided.

The term "desired stain resistance" as used herein means that as shown in the section of Examples, the fabric has an initial water repellency in accordance with JIS L1092 of 95 or higher, and in the salad oil stain resistance test described in the section of Examples, no oil stain is observed on the front and rear surfaces of the fabric and on the soft wipe after 24 hours at 83° C. The temperature of 83° C. tends to lower the effect of the fluorine-based water-and-oil repellent agent. The fabric of the present invention, however, allows stains caused by oily foodstuffs to be easily removed because even when salad oil is dropped onto the surface of the fabric and the fabric is then left at a temperature of 83° C., the fabric does not let the oil through.

The term "desired flame retardancy" as used herein means the case where a test is carried out in accordance with "Flammability of Interior Materials" defined in Federal Motor-Vehicle Safety Standard (FMVSS) and the fabric does not ignite even after a 15-second flame application (N), or the fabric ignites by applying a flame but after the flame crosses A marked line, the flame is extinguished within a burnt distance of 101 mm within a burning time of 60 seconds. In particular, it is preferable that the fabric is evaluated to be "N" according to the above criteria.

In the friction fastness test described in the section of Examples, it is also preferable that the fabric of the present invention achieves grade 4 or higher in both the "DRY" and "WET" tests.

As a ground fabric used in the present invention, a polyester fabric is selected in terms of easily achieving the desired flame retardancy.

The term "polyester fabric" as used herein means a fabric containing polyester fiber, and may be not only a woven fabric, a knitted fabric, and a nonwoven fabric composed of polyester fiber alone, but also a blended fabric, an interknitted fabric or the like used in combination of polyester fiber and other fibers (natural fibers such as cotton and wool, or chemical fibers such as polyamide, rayon, and acryl). The proportion of the polyester fiber in the fiber constituting the fabric is preferably 60% by weight or more, more preferably 70% by weight or more, especially preferably 80% by weight or more, and even more preferably 90% by weight or more. An especially preferable fabric is composed of polyester fiber, having a thickness of 0.2 mm to 3.0 mm (basis weight of 100 $g/m^2$ to 700 $g/m^2$), in particular, a thickness of 0.4 mm to 2.6 mm (basis weight of 200 $g/m^2$ to 500 $g/m^2$).

In the present invention, the polyester fabric is impregnated with a fluorine-based water-and-oil repellent agent (first fluorine-based water-and-oil repellent agent) before the coating of one side thereof (step a: stain resistant finish). The fluorine-based water-and-oil repellent agent is a compound containing a perfluoroalkyl group in which all or a part of hydrogen atoms in the hydrocarbon group are replaced by fluorine atoms. In the present invention, in particular, a polymer containing a monomer having a perfluoroalkyl group is preferably used. Examples of the first fluorine-based water-and-oil repellent agent that may be used in the present invention include a commercially available product under the trade name of AsahiGuard E-SERIES from Asahi Glass Co., Ltd. and a commercially available product under the trade name of NK GUARD S series from Nicca Chemical Co., Ltd.

The first fluorine-based water-and-oil repellent agent to be used for immersion treatment may be one or more kinds (e.g., two to three kinds).

In step a) of the present invention, immersion treatment generally called a padding treatment or a dip-nip treatment may be employed. For example, an aqueous treatment liquid containing a first fluorine-based water-and-oil repellent agent (solid content) in an amount of 1.0% to 5.0% by weight, and more preferably 1.5% to 3.5% by weight is prepared, the polyester fabric is immersed in the treatment liquid (e.g., for 2 to 5 minutes) and squeezed with rollers (mangles) or the like, thereby allowing the treatment liquid to be contained in the entire fabric, followed by drying the fabric, so that a fabric having a first fluorine-based water-and-oil repellent agent adhered to not only the surface of the fabric but also the fiber inside the fabric (a fabric impregnated with the first fluorine-based water-and-oil repellent agent) can be obtained. Appropriate dry conditions are, for example, a temperature of 110° C. to 170° C., in particular, 120° C. to 160° C., and a time of about 1 minute to 5 minutes.

The amount of the first fluorine-based water-and-oil repellent agent to be impregnated in the fabric by the stain-resistant finish can be calculated by a concentration of the fluorine-based water-and-oil repellent agent in the treatment liquid and a squeezing rate. The impregnated amount, per unit area of fabric, of the first fluorine-based water-and-oil repellent agent contained in the dried fabric is suitably in the range of 2.0 $g/m^2$ to 8.0 $g/m^2$, more preferably 3.0 $g/m^2$ to 7.0 $g/m^2$, and even more preferably 4.0 $g/m^2$ to 6.5 $g/m^2$.

After the stain-resistant finish by the step a), cleaning (reduction cleaning or hot water cleaning) treatment may be performed. In general, fiber products dyed at a high dye concentration are subjected to reduction cleaning in order to remove excess dye which may cause color transfer or the like. The reduction cleaning is usually a step of placing a fiber product in an aqueous solution containing hydrosulfite and sodium hydroxide, and cleaning it with the aqueous solution having a temperature of about 80° C. (e.g., 65° C. to 90° C., more preferably 70° C. to 85° C.). Even though a fabric dyed at a high dye concentration, however, is subjected to reduction cleaning after dyeing, the dye easily exudes from the fabric due to the stain-resistant finish, which in turn the friction fastness of the fabric deteriorates after the stain-resistant finish (color transfer easily occurs). Therefore, the fabric dyed at a high dye concentration is preferably subjected to reduction cleaning even after the stain-resistant finish. In addition, the stain-resistant finish tends to deteriorate (harden) the texture of the fabric, but the texture can be improved by cleaning. Therefore, it is preferable that a fabric free from the friction fastness problem (a fabric dyed at a low dye concentration) is also subjected to cleaning treatment after the stain-resistant finish. The fabric dyed at a low dye concentration may be cleaned with hot water (e.g., 65° C. to 90° C., more preferably 70° C. to 85° C.) not by reduction cleaning. In the cases of both the reduction cleaning and the hot water cleaning, the cleaning time can be set in the range of 1 minute to 60 minutes, for example, about 15 to 40 minutes.

The selection of either reduction cleaning or hot water cleaning in the cleaning step after the stain-resistant finish can be determined by a measure of color transferability to the fabric (color transfer easily occurs in the fabric dyed at a high dye concentration and less occurs in the fabric dyed at a low dye concentration). Examples of the fabric dyed at a high dye concentration include fabrics dyed at a dye concentration of about 5% owf or more such as black, blue, red, purple, dark gray, dark blue and dark green. Examples of the fabric dyed at a low dye concentration include fabrics dyed at a dye concentration of less than about 5% owf such as white, light gray, beige, and cream. More specifically, when the stain-resistant finished fabric has a friction fastness of grade 4.0 or higher in both the DRY and WET tests, reduction cleaning can be judged as unnecessary, and when less than grade 4.0, reduction cleaning can be judged as necessary. The friction fastness is measured in accordance with JIS L0849 (Test methods for color fastness to rubbing).

After the step a), the fabric is arbitrarily subjected to the cleaning treatment, followed by drying (e.g., dried at a temperature of 110° C. to 170° C., in particular, 120° C. to 160° C. for about 1 minute to 5 minutes). Thereafter, a coating layer containing a second fluorine-based water-and-oil repellent agent and a flame retardant is formed on one side of the fabric (step b).

As the second fluorine-based water-and-oil repellent agent used in step b), those described above as the first fluorine-based water-and-oil repellent agent of step a) can be used; the same agent as or a different agent from the first fluorine-based water-and-oil repellent agent may be used; and the second fluorine-based water-and-oil repellent agent may be used alone or in combination of two or more kinds.

The flame retardant to be used in step b) is preferably a phosphorus flame retardant having a solubility to water at 20° C. of 4% (4 g/100 g of water) or less. Examples of the phosphorus flame retardant include those selected from the group consisting of phosphonic acid esters, phosphoric acid amides, phosphoric acid ester amides, aromatic phosphoric acid esters, halogen-containing phosphoric acid esters, inorganic polyphosphates, diammonium phosphate, and the like. In particular, an organic phosphorus flame retardant is preferable. An example of the preferred flame retardant is a phosphonic acid ester-based flame retardant and/or melamine phosphate.

The composition for forming the coating layer preferably contains the second fluorine-based water-and-oil repellent agent in an amount of 1.0% to 6.0% by weight, more preferably 1.5% to 5.0% by weight, and even more preferably 2.0% to 4.0% by weight (all are proportions of the weight of the solid content of the fluorine-based water-and-oil repellent agent to the total weight of the solid content of the coating composition), and preferably contains the flame retardant in an amount of 25% to 75% by weight, more preferably 40% to 70% by weight, and even more preferably 50% to 65% by weight (all are proportions of the weight of the solid content of the flame retardant to the total weight of the solid content of the coating composition).

The coating of step b) is preferably carried out so that the second fluorine-based water-and-oil repellent agent content of the coating layer, per unit area of fabric, is preferably in the range of 0.5 g/m$^2$ to 4.0 g/m$^2$, more preferably 0.7 g/m$^2$ to 3.5 g/m$^2$, and even more preferably 1.0 g/m$^2$ to 3.0 g/m$^2$, and so that the flame retardant content of the coating layer, per unit area of fabric, is preferably in the range of 25 g/m$^2$ to 60 g/m$^2$, more preferably 28 g/m$^2$ to 55 g/m$^2$, and even more preferably 30 g/m$^2$ to 50 g/m$^2$.

The total amount of the first fluorine-based water-and-oil repellent agent impregnated in the fabric and the second fluorine-based water-and-oil repellent agent contained in the coating layer, per unit area of fabric, is preferably in the range of 2.5 g/m$^2$ to 10.0 g/m$^2$, more preferably 4.0 g/m$^2$ to 9.5 g/m$^2$, and even more preferably 5.0 g/m$^2$ to 9.0 g/m$^2$.

The composition for forming the coating layer according to the present invention contains a binder for adhering (fixing) the fluorine-based water-and-oil repellent agent or the flame retardant to the fabric. As a preferred binder, a polyester resin, an acrylic resin, or a urethane resin may be used. For an application requiring flame retardancy, a polyester resin is preferably used, and for an application requiring cost or texture, an acrylic resin is preferably used.

As the polyester resin, acrylic resin, or urethane resin, commercially available ones used as a binder for usual fabric coating composition can be used.

In particular, the binders are preferably of soft type, an acrylic resin having a Tg of −30° C. to −45° C. is preferable, and a urethane resin having a minimum film-forming temperature (MFT) of 0° C. to 5° C. is preferable.

The coating composition may contain a thickener. As the thickener, an acrylic acid-based thickener or a urethane associative type thickener can be used. The amount of the thickener adhered to the fabric is usually in the range of about 0.5 g/m$^2$ to 5.0 g/m$^2$.

The viscosity of the coating compositions is suitably in the range of about 20,000 mPa·s to 70,000 mPa·s, and in particular preferably about 35,000 mPa·s to 55,000 mPa·s. As used herein, the viscosity of the coating composition means a viscosity measured using a B-type viscometer (BH type) at a measured temperature of 20° C. with a rotor No. 6 at a rotation speed of 10 rpm, after an elapse of 30 seconds from the start of the rotation.

The coating compositions can be applied to the fabric using a knife coater, a comma coater, a bar coater, a die coater, a kiss-roll coater, or a gravure coater or the like. After the application of the coating compositions to the fabric, drying conditions are, for example, drying temperature in the range of 110° C. to 170° C., in particular 120° C. to 160° C., and drying time of about 2 to 5 minutes.

The binder content of the coating layer, per unit area of fabric, is in the range of about 15 g/m$^2$ to 35 g/m$^2$ (in particular, about 18 g/m$^2$ to 30 g/m$^2$). When the thickener is an acrylic resin or a urethane resin, the combined amount of the binder and the thickener resin is preferably within the above range.

An excessively small amount of the binder tends to fail to securely fix the fluorine-based water-and-oil repellent agent and the flame retardant to the fabric. On the other hand, an excessively large amount thereof may harden the texture.

The amount of the coating layer on the fabric (after drying), per unit area of fabric, is preferably in the range of 45 g/m$^2$ to 90 g/m$^2$, and more preferably 50 g/m$^2$ to 85 g/m$^2$.

In the present invention, after the coating layer is formed on one surface of the fabric in step b), a step (step c) of cleaning the fabric with hot water is carried out. Usually, when the fabric impregnated with the water-and-oil repellent agent or the coated fabric is cleaned with hot water, the effects are expected to be reduced due to effusion of the agent. Therefore, the fabric is not cleaned after the chemical immersion or the coating. In the present invention, however, even though the fabric is subjected to hot water cleaning after the forming of the coating layer, desired flame retardancy can be maintained and stain resistance can be improved. Further, the hot water cleaning step allows the fabric to have good texture (be softened). It is believed that the stain resistance is improved by step c) because at least a part or all of the surfactant or the emulsifier in the coating layer is washed away during the hot water cleaning step, and that the texture is enhanced because the coating agent or the water-and-oil repellent agent present between fibers is loosened during the cleaning to thereby enhance the flexibility of the fibers.

Since the coating layer formed in step b) contains the second fluorine-based water-and-oil repellent agent, hot water at less than 65° C. does not sufficiently wet the fabric, failing to achieve a satisfactory stain resistance improving effect by hot water cleaning. On the other hand, hot water exceeding 90° C. is more likely to remove the second fluorine-based water-and-oil repellent agent and the flame retardant in the coating layer, which may deteriorate the stain resistance or flame retardancy.

Therefore, in step c), the fabric is preferably cleaned with hot water of 65° C. to 90° C. (more preferably 70° C. to 90° C., and even more preferably 75° C. to 85° C.). The cleaning time is suitable for about 1 to 30 minutes, more preferably about 5 to 25 minutes, and even more preferably about 10 to 20 minutes.

A preferred example of step c) will be described. For example, using a continuous cleaning device having plural baths (e.g., 4 to 6 baths), each capable of holding 2000 to 4000 liter of hot water, in which rollers are alternately arranged upward and downward inside the bath and a fabric can run obliquely upward and downward in spread state in each bath (e.g., a fabric having a width of about 100 cm to 200 cm is run obliquely upward and downward in spread state by a length of about 15 m to 30 m in each bath), continuous cleaning can be carried out while fresh hot water is constantly supplied (e.g., at a supply rate of 5 L/min to 15 L/min). The cleaning time can be adjusted depending on the travel rate of the fabric. For example, in the case of a five-bath continuous cleaning device capable of cleaning 100 meters of fabric in five baths (20 m per bath), travel of the fabric at a rate of 5 m/min results in a cleaning time of 20 minutes, and travel at 10 m/min results in 10 minutes. When water in the baths becomes dirty, all the hot water is preferably replaced (e.g., all the hot water in the baths are replaced every time 600 to 1000 m-long fabric is cleaned). Thus, cleaning of the fabric in spread state achieves soft cleaning, thereby easily suppressing the effusion of the agent from the fabric. Further, cleaning of the spread fabric can prevent the fabric from being wrinkled.

The fabric is dried after the hot water cleaning step. Appropriate dry conditions are, for example, a temperature of 110° C. to 170° C., in particular, 120° C. to 160° C., and a time of about 1 minute to 5 minutes.

In the present invention, a foam sheet may be bonded to one surface (a surface having the coating layer) of the fabric after the step c). Examples of the foam sheet include a polyurethane foam (slab urethane or the like) having a thickness of 2.0 mm to 10 mm. A laminated composite composed of the fabric and the foam sheet is suitably used as an exterior material of a seat (usually, a molded article made from a urethane cushioning material) in a vehicle such as an automobile.

Examples of the method of bonding the foam sheet to one surface of the fabric include flame laminate processing in which a surface layer on one side of the foam sheet is melted with a gas burner to be fused to the one surface of the fabric (on the coating layer) where the coating layer is formed.

In addition, the method of the present invention may include a dyeing step and/or a flame retardant processing step before step a). For example, the fabric may be subjected to dyeing treatment in a bath where a disperse dye is supplied or subjected to flame retardant processing in a bath where an organic phosphorus flame retardant is supplied. An excessive flame retardant during the flame retardant processing in the bath may deteriorate stain resistance of the fabric. Therefore, the amount of the flame retardant (solid content) supplied in the in-bath processing, in the unit owf (supply amount relative to the weight of the fabric), is suitably in the range of 0.2% to 2.0% owf, in particular about 0.4% to 1.3% owf, and the amount of the flame retardant adhered to the fabric is suitably in the range of 0.5 g/m$^2$ to 4.0 g/m$^2$, in particular about 1.0 g/m$^2$ to 3.0 g/m$^2$.

Further, the dyeing and flame retardant steps may be carried out in the same bath. In addition, when the fabric is dyed at a high dye concentration (about 5% owf or more) in the dyeing step, reduction cleaning may be carried out after dyeing.

The present invention will be described in more detail below by means of Comparative Examples and Examples, without intending to limit the present invention thereto.

EXAMPLES

Example 1

A polyester fabric (polyester: 100%, basis weight: 360 g/m$^2$) was treated according to the steps shown in Table 1.

Regarding the steps of Table 1, for the dyeing treatment (step 1), 0.84% owf (in terms of solid content) of a phosphoric acid amide flame retardant commercially available under the trade name of VIGOL FV-6010 from Daikyo Chemical Co., Ltd. was added together with a black disperse dye (added so as to have about 9.8% owf in terms of solid content), and in-bath flame retardant processing was carried out simultaneously with dyeing.

For the stain-resistant finish (step 4) by dip-nip process, a mixture of a fluorine-based water-and-oil repellent agent commercially available under the trade name of AsahiGuard E-SERIES from Asahi Glass Co., Ltd. and a fluorine-based water-and-oil repellent agent commercially available under the trade name of NK GUARD S series from Nicca Chemical Co., Ltd. was used as a first fluorine-based water-and-oil repellent agent, and the polyester fabric was immersed (at 150° C. for 2 minutes and 30 seconds) in an aqueous dispersion containing 2.44% by weight (in terms of solid content) of the first fluorine-based water-and-oil repellent agent. Subsequently, the immersed fabric was squeezed under a pressure of 3.0 kgf/cm$^2$ with mangles (pick-up rate: 60%).

In the coating steps (steps 8 and 9), using a coating composition which was adjusted so as to have a viscosity in the range of 45,000 to 55,000 mPa·s, the rear surface of the fabric was coated with a knife coater.

The flame retardant used in the coating steps (steps 8 and 9) was an organic phosphorus flame retardant (non-halogen flame retardant coating agent containing an acrylic resin as a binder and mainly containing a phosphonic acid ester flame retardant (solubility to water at 20° C.: 4.0% or less)) commercially available under the trade name of Nonnen CP-104GKO from Marubishi Oil Chemical Co., Ltd.

The second fluorine-based water-and-oil repellent agent used in the coating step (step 8) was a fluorine-based water-and-oil repellent agent commercially available under the trade name of NK GUARD S series from Nicca Chemical Co., Ltd.

In the cleaning step (step 11) after the forming of the coating layer, using a five-bath continuous cleaning device, 3000 liter of hot water of 80° C. was poured into each bath, and a fabric was run obliquely upward and downward in spread state at a rate of 6.5 m/min with upper and lower rollers arranged inside the bath (about 20 meters of fabric per bath were cleaned). In the meantime, while fresh hot water of 80° C. was constantly supplied into the bath at a rate of 10 L/min, cleaning was carried out for about 15 minutes.

Subsequently, the processed fabric manufactured according to the steps shown in Table 1 was tested by the following methods in terms of friction fastness, flame retardant performance of the fabric, stain resistance against salad oil, and water repellency. On the rear surface side of the processed fabric (the surface having the coating layer formed thereon), a slab urethane sheet having a thickness of 3.0 mm was heat-sealed to form a laminated composite (formed by flame lamination in which a surface layer on one side of the slab urethane sheet was melted with a gas burner, and the melted layer was then bonded to the rear surface of the processed fabric), and thereafter, flame retardant performance of the laminated composite was measured.

<Friction Fastness>

A dry test (DRY) and a wet test (WET) were carried out with the processed fabrics in accordance with JIS L0849 (Test methods for color fastness to rubbing). Staining was evaluated as grades 1 to 5 using a gray scale for assessing staining (JIS L0805). The grade equal to or higher than grade 4 is evaluated as Pass.

<Flame Retardant Performance>

A test was carried out in accordance with "Flammability of Interior Materials" defined in Federal Motor-Vehicle Safety Standard (FMVSS) to evaluate the flame retardant performance.

When a fabric (a processed fabric alone or a laminated composite) did not ignite even after a 15-second flame application (N), or when a fabric ignited by applying a flame but after the flame crossed A marked line, the flame was extinguished within a burnt distance of 101 mm within a burning time of 60 seconds (101 mm/min or less), the fabric was evaluated as Pass.

<Stain Resistance Test with Salad Oil>

A sheet having a size of about 10×10 cm square was prepared from each sample (processed fabric) as a test piece and the test was then carried out. A soft wipe (Elleair Prowipe) was placed on a tray, and the test piece was put thereon (a coated test piece was put on the soft wipe with its coating surface (rear surface) downward). Salad oil was dropped in 5 places on the test sample with a pipette so that each droplet on the sample has a diameter of about 5 mm or 0.05 ml of the oil is dropped in each place.

The tray was allowed to stand still in a Geer oven at 83° C. for 24 hours. After an elapse of 24 hours, the tray was taken out and then observed whether the salad oil dropped spots on the front surface of the test piece were wet or not (the oil stained or not), or whether any oil stain due to the salad oil was present on the rear surface and the soft wipe or not. When no oil stain was observed on the front and rear surfaces of the test sample and on the soft wipe placed underneath the test piece, the fabric was evaluated as Pass.

<Water Repellency>

A test piece cut into a size of 20 cm×20 cm was attached to a test piece holding frame in a device defined in JIS L1092 6.2 so as not to cause a test piece to become wrinkled.

Into a funnel was poured 250 ml of distilled water or ion-exchange water and sprayed onto the front surface of the test piece.

Next, the frame with the test piece was removed from the support, held horizontally on one end of the frame, tapped once against a solid object on the other end of the frame while the front surface of the test piece faces downward. The frame with the test piece was further rotated by 180°, and the same procedure as above was performed to remove excess droplets.

The wetting state of the test piece still attached to the frame was rated.

0: Complete wetting of the front surface (the sprayed surface) and rear surface

50: Complete wetting of the front surface

70: Half wetting of the front surface at small discrete areas through the cloth

80: Wetting of the front surface with small discrete droplets

90: No wetting of but adherence of small droplets to the front surface

95: No wetting of but slight adherence of small droplets to the front surface

100: No wetting of and no adherence of droplets to the front surface

The fabric having an initial water repellency of 95 or higher was evaluated as Pass.

Table 1 shows the processing steps and the performance of the processed fabric, and Table 2 shows the solid contents of the components adhered to the ground fabric by the dip-nip step and coating step (unit: $g/m^2$).

TABLE 1

| | | | | Processing steps and performance of processed fabric | | | | | | | |
|---|---|---|---|---|---|---|---|---|---|---|---|
| | | | Processing details | | Blank | No. 1 | No. 2 | No. 3 | No. 4 | No. 5 | No. 6 |
| Steps | [1] | Dyeing | Black disperse dye (in-bath flame retardant treatment simultaneously with dyeing) | | ● | ● | ● | ● | ● | ● | ● |
| | [2] | Reduction cleaning (RC) | Hydrosulfite 1 g/L Sodium hydroxide 1 g/L 80° C. × 30 min | | ● | ● | ● | ● | ● | ● | ● |
| | [3] | | Drying | 130° C. × 2 min | ● | ● | ● | ● | ● | ● | ● |

TABLE 1-continued

Processing steps and performance of processed fabric

| | | Processing details | Blank | No. 1 | No. 2 | No. 3 | No. 4 | No. 5 | No. 6 |
|---|---|---|---|---|---|---|---|---|---|
| [4] | Stain-resistant finish | dip-nip First fluorine-based water-and-oil repellent agent 8.2% (150° C. × 2.5 min) | | ● | ● | ● | ● | ● | ● |
| [5] | Drying | 130° C. × 2 min | | ● | ● | ● | ● | ● | ● |
| [6] | Reduction cleaning (RC) | Hydrosulfite 1 g/L Sodium hydroxide 1 g/L 80° C. × 15 min | | | ● | ● | ● | ● | ● |
| [7] | Drying | 130° C. × 2 min | | | ● | ● | ● | ● | ● |
| [8] | Stain resistant flame retardant coating | Second fluorine-based water-and-oil repellent agent + Flame retardant + Acrylic resin | | | | | ● | ● | ● |
| [9] | Flame retardant coating | Flame retardant + Acrylic resin | | | | ● | | | |
| [10] | Drying | 130° C. × 2 min | | | | ● | ● | ● | ● |
| [11] | Cleaning | 80° C. × 15 min (Hot water cleaning) | | | | | | ● | ● |
| [12] | Drying | 130° C. × 2 min | | | | | | ● | ● |
| Results | Friction fastness (Grade) | DRY (Passed at grade 4.0 or higher) | 4.0 | 2.5 | 4.0 | 4.0 | 4.0 | 4.0 | 4.0 |
| | | WET (Passed at grade 4.0 or higher) | 4.5 | 2.5 | 4.0 | 4.0 | 4.0 | 4.0 | 4.0 |
| | Flame retardant performance (single fabric) | Passed at horizontal (mm/min) of 101 mm/min or less or flame retardancy (N) | N | 139 | 136 | N | N | N | N |
| | Stain resistance test with salad oil | Oil stained or not stained after 83° C. × 24 hrs (judged by ○, x) | x | ○ | ○ | x | ○, x Variation | ○ | ○ |
| | Water repellency | Shower method (points) Passed at 95 or higher | | 100 | 100 | 100 | 100 | 100 | 100 |
| | Flame retardant performance (laminated composite) | Passed at horizontal (mm/min) of 101 mm/min or less or flame retardancy (N) | | | | | N | N | N |
| | | Overall judgement (○, x) | x | x | x | x | x | ○ | ○ |

TABLE 2

Solid contents of chemical agents imparted to the ground fabric by dip-nip or coating
(Unit: g/m2)
Ground fabric: Polyester fabric having a basis weight of 360 g/m$^2$

| | | No. 3 | No. 4 | No. 5 | No. 6 |
|---|---|---|---|---|---|
| Stain-resistant finish (Step [4]) | First fluorine-based water-and-oil repellent agent (dip-nip) | 5.27 | 5.27 | 5.27 | 5.27 |
| Coating (Step [8] or [9]) | Binder (Acrylic resin) | 32.6 | 29.2 | 29.2 | 21.3 |
| | Organic phosphorus flame retardant | 52.6 | 47.0 | 47.0 | 34.4 |
| | Second fluorine-based water-and-oil repellent agent | — | 2.8 | 2.8 | 1.3 |
| | Total solid contents in coating (g/m$^2$) | 85.2 | 79.0 | 79.0 | 57.0 |

As shown in Table 1, the blank fabric (a fabric that had been only subjected to dyeing, in-bath flame retardant treatment, and reduction cleaning) was evaluated to be good in terms of friction fastness and flame retardant performance, but had a poor result in the stain resistance test with salad oil. On the other hand, when the fabric was further subjected to dip-nip processing with a water dispersion containing a fluorine-based water-and-oil repellent agent (fabric No. 1), the stain resistance test with salad oil and water repellency test resulted in good, but the flame retardancy and friction fastness were degraded. On the other hand, when the fabric was subjected to dip-nip treatment and then reduction cleaning (fabric No. 2), the friction fastness was improved to grade 4 in both dry and wet tests, but the flame retardant performance was still insufficient. Further, when a flame-retardant back coat layer was formed on the fabric after the dip-nip treatment (fabric No. 3), the flame retardant performance was resulted in "N", but occurrence of oil stain was confirmed in the stain resistance test with salad oil. Next, when a flame-retardant stain-resistant back coat layer was formed on the fabric after the dip-nip treatment (fabric No. 4), the flame retardant performance resulted in "N" but in the stain resistance test with salad oil, both spot(s) with oil stains and spot(s) with no stain were observed on the test piece, showing variation in the test results.

On the other hand, after the coating layer containing a fluorine-based water-and-oil repellent agent and a flame retardant was formed on the rear surface of the fabric, the fabrics washed with hot water (fabric Nos. 5 and 6) achieved desired characteristics in all of the flame retardancy of the laminated article, in addition to the friction fastness, flame retardancy, stain resistance test with salad oil, and water repellency test of the processed fabric.

Example 2

In order to determine the influence of the cleaning of steps 6 and 11 on the texture of the fabric, the following experiments were carried out.

Figure 1:
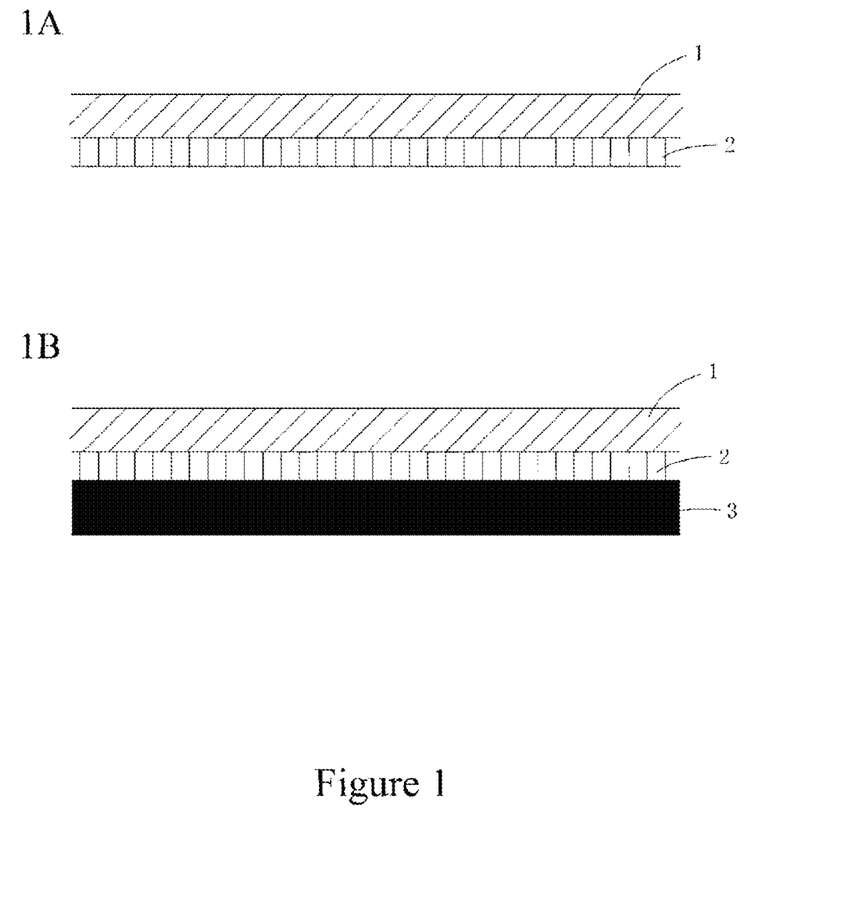
Figure 2:
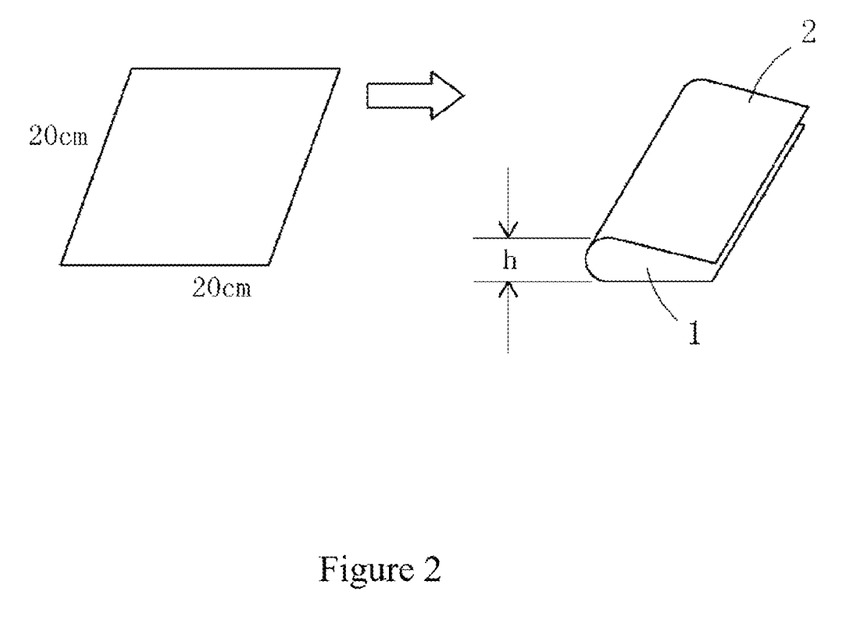
FIG. 2 illustrates the test method for checking the texture of the fabric carried out in Example 2.

Each of the blank fabric, fabrics Nos. 1, 2, 4, and 5 was cut into a size of 20 cm×20 cm, the cut sample was vertically and horizontally folded in half with its rear surface (the coating layer formed side) facing outside, and the height h (mm) of the sample was measured (see FIG. 2). A small value of the folded height h means that the fabric was soft and had good texture, and the larger the value, the harder the fabric becomes and the worse the texture. The measurement results are shown in Table 3.

TABLE 3

Results of evaluation test on texture

|  |  | Blank | No. 1 | No. 2 | No. 4 | No. 5 |
|---|---|---|---|---|---|---|
| Folded height (h mm) | Vertical | 1.20 | 2.20 | 1.83 | 2.32 | 2.20 |
|  | Horizontal | 1.50 | 2.43 | 2.52 | 2.56 | 2.15 |
|  | Average | 1.35 | 2.32 | 2.18 | 2.44 | 2.18 |

As shown in Table 3, compared to the fabric (No. 1) that was not subjected to cleaning after the stain-resistant finish, the fabric (No. 2) cleaned after the stain-resistant finish had a smaller average value of h and had enhanced texture. In the Examples, since the fabric was dyed at a high dye concentration (about 10% owf), the reduction cleaning was carried out after the stain resistant finish. However, when dyed at a low dye concentration (less than about 5% owf), the fabric may be subjected to hot water washing (at 65° C. to 90° C.), instead of reduction cleaning, to thereby obtain a similar effect of enhancing the texture.

Also, compared to the fabric (No. 4) that was not subjected to hot water cleaning after the forming of the coating layer, the fabric (No. 5) cleaned with hot water after the forming of the coating layer had a smaller average value of h and had enhanced texture. In particular, since the average values of h of fabrics No. 2 (without coating layer) and No. 5 (with coating layer) were equal, it was confirmed that the texture of the fabric degraded due to the forming of the coating layer was enhanced to the same level as the texture before the forming of the coating layer by hot water cleaning after the forming of the coating layer.

From the above experiments, in order to obtain a fabric having desired flame retardancy and stain resistance, it was found to be effective that a coating layer containing a fluorine-based water-and-oil repellent agent and a flame retardant was formed on one side of the fabric impregnated with the fluorine-based water-and-oil repellent agent, and thereafter, hot water cleaning was carried out. It was also confirmed that the hot water cleaning after the forming of the coating layer can improve the texture of the fabric. Further, for better texture of the fabric, it was found that a cleaning step (reduction cleaning or hot water washing) was preferably carried out even after the step of impregnating the fluorine-based water-and-oil repellent agent (and before the forming of the coating layer).

According to the present invention, a polyester fabric can be provided that can prevent contamination due to beverages such as juice and coffee, or water and oils contained in food and that can avoid strike-through of oils even after the fabric is left at a temperature around 80° C. for 24 hours. The fabric of the present invention is suitably used as vehicle interior fabric for automobiles or the like because of its excellent flame retardant performance and texture.

REFERENCE SIGN LIST IN FIGURES

1: Polyester fabric impregnated with a fluorine-based water-and-oil repellent agent
2: Coating layer containing a fluorine-based water-and-oil repellent agent and a flame retardant
3: Foam sheet

What is claimed is:

1. A method for manufacturing a fabric comprising the steps of:
   (a) immersing a polyester fabric in a treatment liquid containing a first fluorine-based water-and-oil repellent agent to incorporate the treatment liquid thereinto, followed by drying the fabric;
   (b) coating one surface of the fabric with a coating composition containing a second fluorine-based water-and-oil repellent agent and a flame retardant; and
   (c) cleaning the fabric having the coating layer formed thereon with hot water of 65° C. to 90° C.

2. The method according to claim 1, wherein the one surface of the fabric is a rear surface of the fabric.

3. The method according to claim 1, wherein the coating of the step (b) is carried out so that
   the second fluorine-based water-and-oil repellent agent content of the coating layer, per unit area of fabric, is in the range of 0.5 g/m$^2$ to 4.0 g/m$^2$, and
   the flame retardant content of the coating layer, per unit area of fabric, is in the range of 25 g/m$^2$ to 60 g/m$^2$.

4. The method according to claim 1, wherein the coating composition comprises a binder selected from an acrylic resin, a urethane resin, and a polyester resin, and coating of step (b) is carried out so that the binder content of the coating layer, per unit area of fabric, is in the range of 15 g/m$^2$ to 35 g/m$^2$.

5. The method according to claim 1, wherein the flame retardant is a phosphorus flame retardant having a solubility to water at 20° C. of 4.0% or less.

6. The method according to claim 1, comprising a step of cleaning the fabric after the step (a) and before the step (b).

7. The method according to claim 1, further comprising a step of bonding a foam sheet to the one surface of the fabric after the step (c).

* * * * *